(12) United States Patent
Errickson et al.

(10) Patent No.: US 10,089,171 B2
(45) Date of Patent: *Oct. 2, 2018

(54) EVENT LOGGING AND ERROR RECOVERY

(71) Applicant: International Business Machines Corporation, Armonk, NY (US)

(72) Inventors: Richard K. Errickson, Poughkeepsie, NY (US); Patrick J. Sugrue, Georgetown, TX (US); Peter K. Szwed, Rhineback, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,620

(22) Filed: Aug. 31, 2016

(65) Prior Publication Data
US 2016/0364288 A1    Dec. 15, 2016

Related U.S. Application Data

(63) Continuation of application No. 15/062,398, filed on Mar. 7, 2016, now Pat. No. 9,465,688, which is a
(Continued)

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0706* (2013.01); *G06F 11/076* (2013.01);
(Continued)

(58) Field of Classification Search
CPC ............ G06F 11/0793; G06F 11/3495; G06F 11/3409; G06F 11/3003; G06F 11/3476;
(Continued)

(56) References Cited

U.S. PATENT DOCUMENTS 7,093,154 B2   8/2006   Bartfai et al.
7,983,171 B2   7/2011   Coronado et al.
(Continued)

OTHER PUBLICATIONS

List of IBM Patents or Patent Applications Treated as Related; (Appendix P), filed Jul. 11, 2017; 2 pages.

*Primary Examiner* — Yair Leibovich
(74) *Attorney, Agent, or Firm* — Cantor Colburn LLP; Steven Chiu

(57) ABSTRACT

A method, computer program product, and system to control event logging and error recovery in a system including adapters, ports, and channels are described. The method includes storing a recovery threshold for each event type among a plurality of event types and storing a level-specific logging threshold for each event type, implementing event handlers for each of the channels, the ports, and the adapters of the system, and implementing a threshold manager for the events identified by the event handlers based on the level-specific logging threshold and the recovery threshold for each of the respective event types of each of the events. For any identified event corresponding with a given event type, the implementing the threshold manager includes considering the recovery threshold and the level-specific logging threshold at every level regardless of a level at which the identified event is identified.

1 Claim, 3 Drawing Sheets

Related U.S. Application Data continuation of application No. 14/559,225, filed on Dec. 3, 2014, now Pat. No. 9,606,856.

(51) Int. Cl.
  *G06F 11/14* (2006.01)
  *G06F 11/34* (2006.01)
  *G06F 11/30* (2006.01)

(52) U.S. Cl.
  CPC ........ *G06F 11/079* (2013.01); *G06F 11/0787* (2013.01); *G06F 11/1451* (2013.01); *G06F 11/1469* (2013.01); *G06F 11/1471* (2013.01); *G06F 11/3003* (2013.01); *G06F 11/3409* (2013.01); *G06F 11/3476* (2013.01); *G06F 11/3495* (2013.01); *G06F 2201/84* (2013.01); *G06F 2201/86* (2013.01)

(58) Field of Classification Search
  CPC ............... G06F 11/0706; G06F 11/076; G06F 11/0787; G06F 11/079; G06F 11/1471; G06F 11/1451; G06F 11/1469; G06F 2201/86; G06F 2201/84
  USPC .......................................................... 714/47
  See application file for complete search history.

(56) References Cited

U.S. PATENT DOCUMENTS

| | | | |
|---|---|---|---|
| 8,751,873 B2 | 6/2014 | Compton et al. | |
| 9,015,362 B2 | 4/2015 | Carlson et al. | |
| 9,465,688 B2* | 10/2016 | Errickson | ........... G06F 11/1471 |
| 9,606,856 B2* | 3/2017 | Errickson | ........... G06F 11/0793 |
| 2014/0173364 A1 | 6/2014 | Nishita | |
| 2017/0212799 A1* | 7/2017 | Konireddygari | .... G06F 11/0793 |

* cited by examiner

EVENT LOGGING AND ERROR RECOVERY

DOMESTIC BENEFIT/NATIONAL STAGE INFORMATION

This application is a continuation of U.S. application Ser. No. 15/062,398 filed Mar. 7, 2016, which is a continuation of U.S. application Ser. No. 14/559,225 filed Dec. 3, 2014, the disclosure of which is incorporated by reference herein in its entirety.

BACKGROUND

The present invention relates generally to error handling, and more specifically, to event logging and error recovery.

Large-scale computing systems, also known as mainframes, are connected to each other through coupling adapters. Each of these adapters may include multiple ports, each of which, in turn, includes multiple virtual channels. Typically, the large-scale computing system includes code that monitors each channel, port, and adapter and logs an error or interrupt (referred to generally as an event).

SUMMARY

According to an embodiment, a computer program product to control event logging and error recovery in a system including adapters, ports, and channels includes a computer readable storage medium with program instructions embodied therewith, the program instructions being readable by a processing circuit to cause the processing circuit to perform a method. The method includes storing, in a memory device, a recovery threshold for each event type among a plurality of event types, each event type indicating a type of error or interrupt, each recovery threshold for each event type representing a first number of events of the event type; storing, in the memory device, a level-specific logging threshold for each event type, each level-specific logging threshold for each event type representing a second number of events, a third number of events, or a fourth number of events of the event type, respectively, at an adapter-level, a port-level, or a channel-level; implementing event handlers for each of the channels, the ports, and the adapters of the system, each event handler being associated with one of the channels, one of the ports, or one of the adapters, each event handler identifying events corresponding to the respective channel, the respective port, or the respective adapter; and implementing a threshold manager for the events identified by the event handlers based on the level-specific logging threshold and the recovery threshold for each of the respective event types of each of the events, wherein, for any identified event corresponding with a given event type, the implementing the threshold manager includes considering the recovery threshold and the level-specific logging threshold at every level regardless of a level at which the identified event is identified.

According to another embodiment, a method of controlling event logging and error recovery in a system including adapters, ports, and channels includes storing, in a memory device, a recovery threshold for each event type among a plurality of event types, each event type indicating a type of error or interrupt, each recovery threshold for each event type representing a first number of events of the event type; storing, in the memory device, a level-specific logging threshold for each event type, each level-specific logging threshold for each event type representing a second number of events, a third number of events, or a fourth number of events of the event type, respectively, at an adapter-level, a port-level, or a channel-level; implementing, using a processor, event handlers for each of the channels, the ports, and the adapters of the system, each event handler being associated with one of the channels, one of the ports, or one of the adapters, each event handler identifying events corresponding to the respective channel, the respective port, or the respective adapter; and implementing, using the processor, a threshold manager for the events identified by the event handlers based on the level-specific logging threshold and the recovery threshold for each of the respective event types of each of the events, wherein, for any identified event corresponding with a given event type, the implementing the threshold manager includes considering the recovery threshold and the level-specific logging threshold at every level regardless of a level at which the identified event is identified.

According to yet another embodiment, a system to control event logging and error recovery in a system including adapters, ports, and channels includes a memory device to store, a recovery threshold and a level-specific logging threshold for each event type among a plurality of event types, each event type indicating a type of error or interrupt, each recovery threshold for each event type representing a first number of events of the event type and each level-specific logging threshold for each event type representing a second number of events, a third number of events, or a fourth number of events of the event type identified, respectively, at an adapter-level, a port-level, or a channel-level; and a processor to implement event handlers for each of the channels, the ports, and the adapters of the system, each event handler being associated with one of the channels, one of the ports, or one of the adapters, each event handler identifying events corresponding to the respective channel, the respective port, or the respective adapter, and further configured to implement a threshold manager for the events identified by the event handlers based on the level-specific logging threshold and the recovery threshold for each of the respective event types of each of the events, wherein, for any identified event corresponding with a given event type, the threshold manager is implemented to consider the recovery threshold and the level-specific logging threshold at every level regardless of a level at which the identified event is identified.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

As noted above, each channel, port, and adapter coupling two mainframes may be associated with code that monitors activity and identifies an event (error or interrupt). For example, when a message is sent from one mainframe to another over a virtual channel, a potential event is a timeout which indicates that the message or subsequent response was not properly delivered. If four virtual channels are associated with the port, and the port has a problem, the port problem would give rise to a timeout message from each of the four associated channels each time any of the channels were used, but all the timeout messages would have arisen from the same error source (the port). Because a timeout message would be repeated each time the port were used, event logging would result in a large volume of data. The resulting large volume of logging gives rise to two issues that are addressed by the embodiments discussed herein.

First, the volume of logs may cause earlier more relevant logs to be overwritten. This is because the memory buffer storing logs may be exceeded based on the large volume of logs, thereby causing earlier logs to be deleted in order to store more recent ones. Secondly, the volume of logs may obfuscate the issue of when an event rises to the level of requiring intervention. In the example discussed above, for example, a problem at a port may be reported so often that action is taken. The event may invoke firmware acting as interrupt handlers and a log reporting the event may be used to identify the source of the event. Based on a level of an event (i.e., channel-level, port-level, adapter-level), the same event may be reported numerous times and repeatedly. For example, a problem at a port effects each of the virtual channels associated with that port. Thus, for example, to address the problem before the problem actually rises to the level of requiring a fix. Current systems may include fixed interrupt logging or interrupt thresholds at the channel level or event level. However, the counters associated with these thresholds are not restarted automatically such that, once a threshold is reached, the interrupt is masked off until a manual service is performed. Embodiments of the systems and methods detailed herein relate to high level or system-wide management of thresholds for both logging and error handling with each of the thresholds being associated with time durations.

Figure 1:
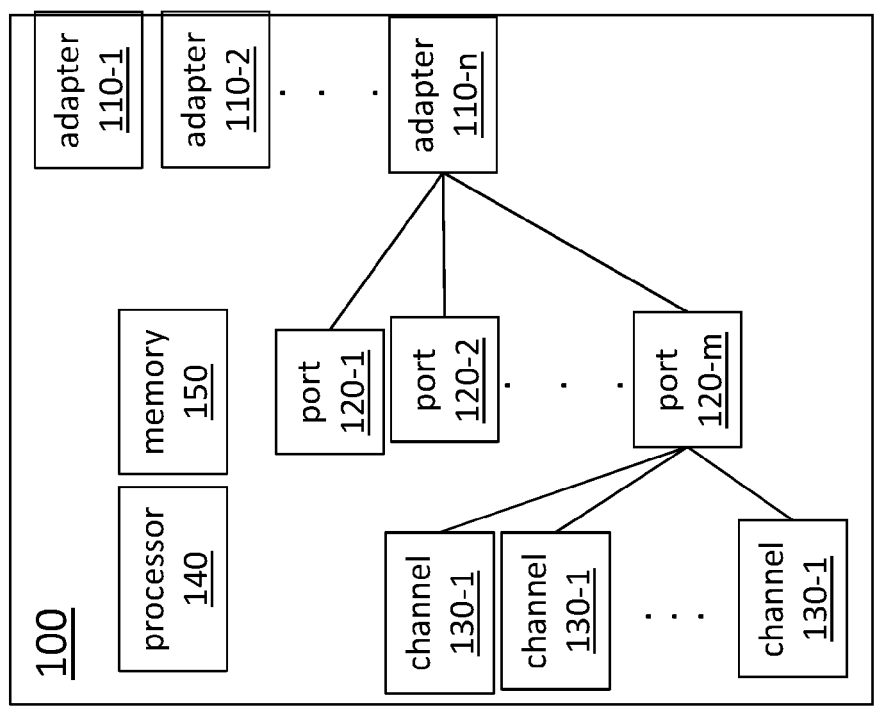
FIG. 1 is a block diagram of a system according to an embodiment.

FIG. 1 is a block diagram of a system 100 according to an embodiment. The system 100 is a mainframe, for example. The system 100 includes adapters 110-1 through 110-$n$ (referred to generally as 110). The adapters 110 are coupling adapters that connect the system 100 to another system 100 (e.g., mainframe). Each adapter 110 includes ports 120-1 through 120-$m$ (referred to generally as 120). Different adapters 110 may have different numbers of associated ports 120. Each port 120 is associated with virtual channels 130-1 through 130-$p$ (referred to generally as 130). Different ports 120 may have different numbers of associated channels 130. The system includes one or more processors 140 and one or more memory devices 150. As further discussed with reference to FIG. 2 below, the processor 140 and memory device 150 implement threshold management with respect to event logging and recovery.

Figure 2:
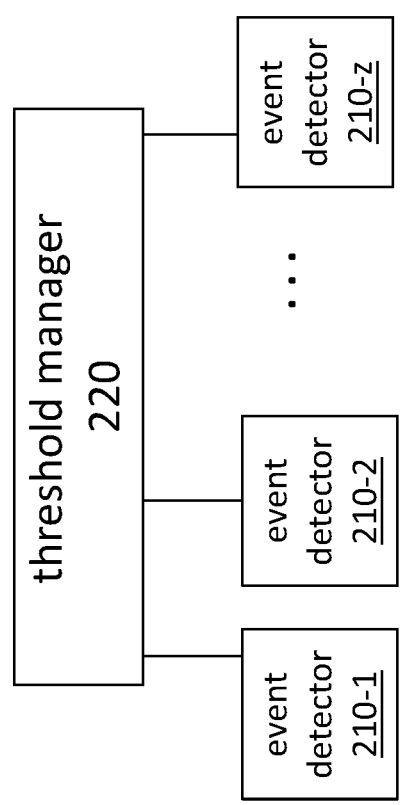
FIG. 2 is a logic diagram of aspects of the system according to an embodiment.
Figure 3:
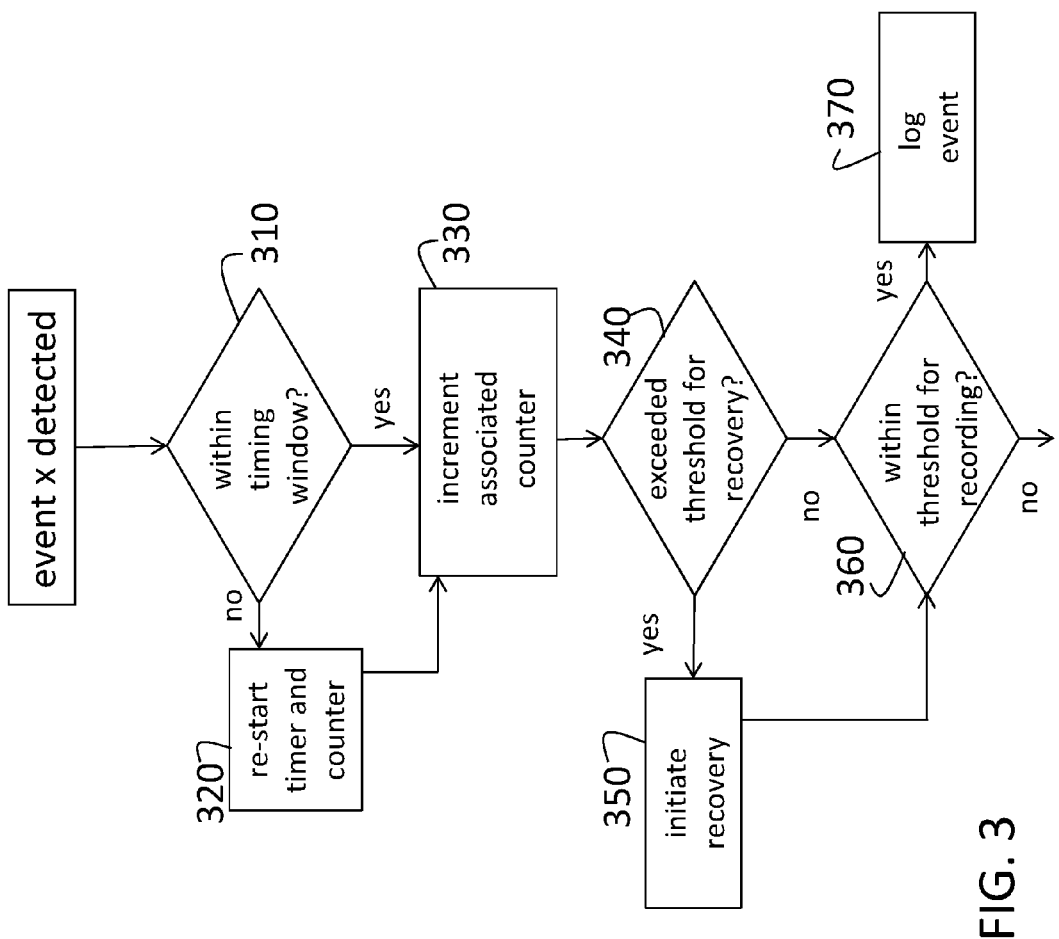
FIG. 3 is a process flow of the threshold routine implemented by the threshold manager of the system according to an embodiment.

FIG. 2 is a logic diagram of aspects of the system 100 according to an embodiment. Specifically, the event handling aspect of the system 100 is of interest. The logic blocks discussed with reference to FIG. 2 are implemented by the processor 140 and memory 150 of the system 100. Each channel 130, port 120, and adapter 110 of the system 100 is monitored via a corresponding event detector 210 (event detectors 210-1 through 210-$z$ are generally referred to as 210). According to the embodiments detailed herein, each of the event detectors 210 communicates with a system-level threshold manager 220. A threshold routine, discussed below with reference to FIG. 3, is executed by the processor 140 when any event detector 210 detects an event, and this threshold routine uses system-level thresholds and a system-wide database of event counts managed by the threshold manager 220. The threshold manager 220 may be regarded as a filter for event handling as further discussed below. This is because events that are detected by the event detectors 210 may be filtered out (not recorded or acted upon) based on executing the threshold routine.

FIG. 3 is a process flow of the threshold routine implemented by the threshold manager 220 of the system 100 according to an embodiment. When an event x is detected by one of the event detectors 210 (associated with a channel 130, port 120, or adapter 110), the process shown at FIG. 3 begins. The event x is associated with several fields of information that are input to the threshold routine. Exemplary fields are, indicated in Table 1. In alternate embodiments, other information may be included as part of the indication of event x that facilitates determining the type of event that event x may be categorized as. The categorization or identification of a given event x as a type of event is significant for purposes of determining which timing window, recovery threshold, and logging threshold (described further below) apply to the event x. By associating all events of a given type with the same timing window, recovery threshold, and logging threshold, system-level threshold management is facilitated as detailed below.

TABLE 1

Exemplary fields included with event information provided by event detector 210.

| FIELD | DESCRIPTION |
| --- | --- |
| element | indicates whether event detector 210 is associated with a port 120 |
| chid_number | Channel Identifier (chid) number if element is a channel |
| adapter_id | adapter 110 id associated with port 120, if element is a port 120 |
| port_number | port 120 number if element is a port 120 |
| src_code | System Reference Code (SRC) indicating which recovery threshold and logging threshold (and associated timing window) to use (i.e., which event type) |
| int_count | variable of total count |

As further detailed below, a feature of the threshold routine is that, based on the event type and the level of the event handler 210 that identified the event (i.e., channel-level, port-level, or adapter-level), the counter at more than one level may be incremented. Prior to implementing the threshold routine shown in FIG. 3, thresholds are established for each event type at each level. For example, for a message timeout (src_code or event type is message timeout), which indicates failure of message transmission over a particular channel, the counter for the failing channel associated with the message timeout event type is incremented. In addition, the counter associated with the message timeout event type for the port corresponding to the failing channel is also incremented, and the counter associated with the message timeout event type for the adapter corresponding with the port of the failing channel is also incremented. As further explained below, this system-level handling of counters facilitates management of logging memory and appropriate recovery.

At block 310, it is first determined whether the timing window for the type of event that event x represents is within the previous (existing) timing window. As indicated by Table 1, a code (src_code) may be provided with the event x information that indicates which timing window applies (identifies the event type). Different event types may have different timing windows associated with them, and the threshold manager 220 tracks each timing window separately. Thus, at a given time, the timing window for one type of event may be exceeded while the timing window for another type of event may not be exceeded. If the time of the event x is not within the current timing window for the corresponding event type, then the process proceeds to block 320. At block 320, a new timing window is started for the type of event that event x represents (timer is restarted), a new threshold counter, at each level, as discussed below, is started by resetting the previous counter and proceeding to block 330, where the counter is incremented. If, at block 310, the time of event x is determined to be within the previous timing window for the corresponding event type, then the counter associated with that timing window is incremented at block 330.

To be clear, the counter associated with a given event type is level-specific such that each (level-specific) counter is associated with an adapter-level counter, a port-level counter, and a channel-level counter. That is, if the event x is identified by an event handler of a port 120, for example, then the port-level counter is incremented, and the associated adapter-level counter is also incremented, but the channel-level counters associated with each of the virtual channels 130 of the port 120 are not incremented at block 330. Incrementing the counters at levels above the level at which an event handler 210 identifies the event x facilitates proper threshold management according to the threshold routine. This is because levels about the level at which a type of error or interrupt occurs are more likely to catch repeating errors. For example, as noted above, when a port 120 issue prevents channels 130 of that port 120 from communicating properly, the event handler 210 associated with each channel 130 generates an event of the message timeout event type. At the channel 130 level, each channel-level counter individually counts the number of events of the message timeout event type, but at the port 120 and the adapter 110 levels, the associated counters aggregate the number of events of the message timeout event type from the various channels 130. As a result, based on appropriately set thresholds levels at the port-level and the adapter-level, the counters at the port-level and adapter-level may determine that logging should be stopped due to repeating errors more quickly than if only the channel-level counters were thresholded.

At block 340, it is determined whether the level-specific counter (incremented at block 330) exceeds the threshold for recovery (referred to as the recovery threshold here). The recovery threshold may be compared with a sum of the channel-level counter, port-level counter, and adapter-level counter values or the recovery threshold may be categorized by channel 130, port 120, or adapter 110 level, like the counters, such that the recovery threshold may break down as a channel-level recovery threshold, port-level recovery threshold, and adapter-level recovery threshold. If the recovery threshold has been reached, then recovery is initiated at block 350. The system-level counter facilitates grouping events to be analyzed in an intelligent way. For example, recovery may be initiated for a port 120 based on a threshold number of events being observed for associated channels 130 of the port 120 (that is, all the events of the same event type associated with all the channels 130 that are affected are considered together rather than individually at the port-level and the adapter-level). Because the events of each of the channels 130 are not mistakenly regarded and thresholded only individually, as though they are unrelated, the underlying problem at the port is addressed more efficiently.

Following recovery (at block 350), the logging threshold is checked (block 360). If the recovery threshold has not been exceeded (block 340) or after the recovery procedure has been initiated (block 350), it is determined, at block 360, whether any level-specific counter exceeds the corresponding threshold for event logging (referred to as the level-specific logging threshold here). As further clarified by the exemplary thresholds below, a different logging threshold (i.e., a level-specific logging threshold) applies based not only on the event type of event x but also on the level (channel 130, port 120, or adapter 110) of the counter. Thus, while there may be a channel-level recovery threshold, port-level recovery threshold, and adapter-level recovery threshold, there will be a channel-level logging threshold, port-level logging threshold, and adapter-level logging threshold (referred to collectively as the level-specific logging threshold for a given event type). If the level-specific logging threshold has not been reached (block 360) (i.e., the channel-specific count is below the channel-specific logging threshold, the port-specific count is below the port-specific logging threshold, and the adapter-specific count is below the adapter-specific logging threshold), then the event x is logged at block 370. If the level-specific logging threshold has been exceeded, then the event x is not logged.

The specific criteria for suspension of event logging must be clearly understood. When one level-specific logging threshold has been reached, logging of a subsequent event of the same event type may still occur (in the same timing window). This is part of the level-specific nature of the threshold routine. For example, if event x in FIG. 3 is identified by an event handler 210 of channel x 130, then the counters associated with channel x 130, the associated port 120, and associated adapter 110 are incremented (block 330), and at block 360, it may be found that the logging threshold for the event type of event x for channel x 130 is exceeded. In this case, event x is not logged. However, if a subsequent event y is of the same event type as event x but is identified by the event handler 210 of channel y 130 (associated with the same port 120 and adapter 110 as channel x 130), the event y may be logged (block 370). Whether event y associated with channel y 130 is logged would be based on the counters associated with the same port 120 and adapter 110 (as those associated with channel x 130) and those counters would be incremented (block 330) prior to the check at block 360, but the channel-level counter associated with event y would be the counter associated with channel y 130, which may not have reached the channel-level threshold for the event type of event y. Thus, if the counter associated with channel y 130 and the counters associated with the associated port 120 and adapter 110 have not reached their corresponding thresholds, event y would be logged (block 370). As the example below indicates, even though the counters associated with a port 120 and adapter 110 aggregate the number of events of the same event type that are identified at each associated channel, for example, the thresholds associated with a port 120 and adapter 110 are higher. As a result, these thresholds may not be reached at the same time as or before the threshold associated with a channel 130. It should be clear that different ports 120 associated with the same adapter 110 are treated the same way as different channels 130 associated with the same port 120 for purposes of incrementing counters at the upper levels. That is, different ports 120 associated with the same adapter 110 whose event handlers 210 indicate events of the same event type would all cause the counter of the adapter 110 for that event type to increment. However, the counters at the levels below would not be incremented (e.g., an event indicated by an event handler 210 of a port 120 has no effect on the channel-level counters associated with channels 130 of that port 120).

Because the process shown at FIG. 3 is a system-level process, as opposed to being isolated within a channel or port, for example, the multi-level events that are based on the same problem (e.g., events at every virtual channel 130 based on a problem at the associated port 120) are prevented from generating a large volume of unnecessary logs. In addition, an underlying problem may be addressed based on the combined system-level counter that is incremented based on each level affected by the problem. The thresholds (recovery threshold and level-specific logging threshold) and timing window for each type of event (and level) may be set based on experimentation or prior knowledge. These thresholds or timing window may be modified as needed for a given system 100 but typically remain static values. The thresholds and timing window values are set on a per src_code basis (i.e., per event type), and are typically stored as static values in the firmware. They may be modified non-disruptively by applying a firmware patch concurrently with updated values. According to an exemplary embodiment, the thresholds for a channel-specific src_code are set as follows: system-level=60; adapter-level=15; port-level=7; channel-level=2. That is, for an event type involving a channel, thresholds are set for each level at which an event of the event type may be identified. Event counters are managed for each combination of level (adapter 110, port 120, or channel 130) and src_code (event type).

While an exemplary embodiment is discussed above that includes channels 130, ports 120, and adapters 110, it should be clear that the embodiments detailed above apply, as well, to a system with additional or alternate levels. For example, there may be levels between an adapter 110 and a port 120 or between a port 120 and a virtual channel 130. As another example, above the adapter 110 level may be an adapter-cage, followed by an input/output frame, and then the system. Regardless, the counters at a level at which an event handler 210 identifies an event and at every level above that level would be incremented and thresholds would be checked as discussed with reference to FIG. 3.

Technical effects and benefits include system-level management and control of event logging and recovery.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product to improve control of event logging and error recovery in a system including adapters, ports, and channels, the computer program product comprising:
  a computer readable storage medium having program instructions embodied therewith, the program instructions readable by a processing circuit to cause the processing circuit to perform a method comprising:
  storing a recovery threshold for each event type among a plurality of event types, each event type indicating a type of error or interrupt, each recovery threshold for each event type representing a first number of events of the event type;
  storing a level-specific logging threshold for each event type, the level-specific logging threshold for each event type representing a second number of events, a third number of events, or a fourth number of events of the event type, respectively, at an adapter-level, a port-level, or a channel-level;
  implementing event handlers for each of the channels, the ports, and the adapters of the system, each event handler being associated with one of the channels, one of the ports, or one of the adapters, and each event handler identifying events corresponding to the respective channel, the respective port, or the respective adapter;
  implementing a threshold manager for the events identified by the event handlers based on the level-specific logging threshold and the recovery threshold for each of the respective event types of each of the events, wherein, for any identified event corresponding with a given event type among the plurality of event types, the implementing the threshold manager includes considering the recovery threshold and the level-specific logging threshold at every level regardless of a level at which the identified event is identified, wherein the implementing the threshold manager includes maintaining a level-specific count corresponding to given event type of the identified event, the level-specific count including a separate counter at the adapter-level, the port-level, and the channel-level, and, for the identified event of the given event type identified at a particular level, the maintaining the level-specific count includes incrementing the counter associated with the particular level and with every level higher than the particular level, the port-level being higher than the channel-level and the adapter-level being higher than the port-level;
  determining whether the recovery threshold for the given event type has been reached by summing the level-specific count corresponding to the adapter-level, the port-level, and the channel-level for the given event type;
  suspending event logging based on the summing, thereby preventing generation of a large volume of unnecessary logs; and
  invoking a recovery to fix an underlying problem indicated by the given event type based on the recovery threshold for the given event type being reached.

* * * * *